(12) United States Patent
Yoshitake et al.

(10) Patent No.: US 7,767,179 B2
(45) Date of Patent: Aug. 3, 2010

(54) METHOD FOR PRODUCING ADSORBENT, ADSORBENT, AND ADSORPTION APPARATUS

(75) Inventors: Tomohiko Yoshitake, Tokyo (JP); Shintaro Kobayashi, Saitama (JP)

(73) Assignee: Hoya Corporation, Tokyo (JP)

( * ) Notice: Subject to any disclaimer, the term of this patent is extended or adjusted under 35 U.S.C. 154(b) by 643 days.

(21) Appl. No.: 11/559,422

(22) Filed: Nov. 14, 2006

(65) Prior Publication Data

US 2007/0107600 A1    May 17, 2007

(30) Foreign Application Priority Data

Nov. 14, 2005    (JP)    .............. 2005-329508

(51) Int. Cl.
  *C01B 25/32*    (2006.01)
  *B01J 20/04*    (2006.01)
(52) U.S. Cl. .................. 423/308; 502/11; 502/400
(58) Field of Classification Search ......... 423/305–308; 502/11, 400; 96/108
  See application file for complete search history.

(56) References Cited

U.S. PATENT DOCUMENTS

| 2006/0207940 A1 | 9/2006 | Kobayashi et al. |
| 2007/0181478 A1 | 8/2007 | Kobayashi et al. |

FOREIGN PATENT DOCUMENTS

| JP | 10-118167 A | * | 5/1998 |
| JP | 10-153589 | | 6/1998 |
| JP | 3228955 | | 11/2001 |
| JP | 2005-017046 | | 1/2005 |
| JP | 2005-17046 | | 1/2005 |
| WO | 2004/108272 | | 12/2004 |

OTHER PUBLICATIONS

Peld et al., "Effect of Fluoride and Carbonate Substitutions on Apatites Cd2+ Sorption Capacity," 2001, Toxicological and Environmental Chemistry, 81, pp. 43-53.*

(Continued)

*Primary Examiner*—Wayne Langel
*Assistant Examiner*—Brittany M Martinez
(74) *Attorney, Agent, or Firm*—Greenblum & Bernstein, P.L.C.

(57) ABSTRACT

A method for producing an adsorbent which is stable toward a liquid such as an eluant and which shows excellent reproducibility in selectively adsorbing and separating an object compound, the method includes the steps of: preparing a base material having a surface, in which at least part of the surface of the base material is formed of a material containing as its major component apatite which is represented by the composition formula $Ca_{10}(PO_4)_6((OH)_{1-a}X_a)_2$; preparing a solution containing ions of at least one metal element; substituting at least part of Ca of the apatite by the at least one metal element by bringing the base material into contact with the solution to obtain a substituted base material; and subjecting the substituted base material to heat treatment at 50 to 400° C. for 0.5 to 10 hours, wherein the base material and the substituted base material are not exposed to a temperature exceeding 500° C. for 4 hours or longer from the substitution step to the completion of production of the adsorbent.

5 Claims, 4 Drawing Sheets

OTHER PUBLICATIONS

T. Nordstrom et al., "Generation of a New Protein Purification Matrix by Loading Ceramic Hydroxyapatite with Metal Ions—Demonstration with Poly-histidine Tagged Green Fluorescent Protein", Journal of Biotechnology, 69 (1999), pp. 125-133.

U.S. Appl. No. 11/560,077 (Kobayashi et al.), filed Dec. 9, 2005 and entitled "Absorbent, Absorption Apparatus, and Method for Manufacturing the Absorption Apparatus";.

English language abstract of JP 10-153589.

English language abstract of JP 2005-17046.

M. Wakamura et al.; Colloids and Surfaces A: Physicochemical and Engineering Aspects, 1998, vol. 142, pp. 107-116.

English Language Abstract of JP 2005-017046.

English Language Abstract of W.O. 2004/108272.

English Language Abstract of JP 3228955.

J. Porath; Trends in Analytical Chemistry, 1988, vol. 7, No. 7, pp. 254-259.

U.S. Appl. No. 12/199,122, filed Aug. 27, 2008, and entitled "Method of Producing Fluoroapatite, Fluoroapatite, and Adsortion Apparatus."

U.S. Appl. No. 12/184,459, filed Aug. 1, 2008, and entitled "Method of Producing Fluoroapatite, Fluoroapatite, and Adsortion Apparatus."

U.S. Appl. No. 12/240,152, filed Sep. 29, 2008, and entitled "Fluoraopatite Dried Particles and Adsorption Appartus."

* cited by examiner

METHOD FOR PRODUCING ADSORBENT, ADSORBENT, AND ADSORPTION APPARATUS

BACKGROUND OF THE INVENTION

1. Field of the Invention

The present invention relates to a method for producing an adsorbent, an adsorbent, and an adsorption apparatus, and more specifically to a method for producing an adsorbent, an adsorbent produced by such a production method, and an adsorption apparatus produced by using the adsorbent.

2. Description of the Prior Art

Hydroxyapatite has excellent biocompatibility, and has been heretofore widely used as an adsorbent in a column (that is, in an adsorption apparatus) for liquid chromatography to adsorb and separate a protein etc.

However, such an adsorbent made of hydroxyapatite is poor in stability toward a liquid such as an eluant (solvent resistance) and strength, which causes a problem that clogging of a column for liquid chromatography occurs at an early stage due to, for example, disintegration of the adsorbent (that is, such a column for liquid chromatography shows poor reproducibility in adsorbing and separating a protein etc).

From the viewpoint of improving the reproducibility of a column for liquid chromatography, there is proposed an adsorbent obtained by substituting Ca and OH groups of hydroxyapatite by another metal element and F, respectively, and then subjecting the substituted hydroxyapatite to heat treatment (more specifically, at 800° C.) (see, for example, JP-A-10-153589).

However, it cannot be said that the reproducibility of the adsorbent disclosed in JP-A-10-153589 has already been satisfactorily improved. The adsorbent leaves room for improvement, and actually there is still demand for development of an adsorbent more superior in reproducibility.

SUMMARY OF THE INVENTION

It is an object of the present invention to provide a method for producing an adsorbent which is stable toward a liquid such as an eluant and which shows excellent reproducibility in selectively adsorbing and separating an object compound, an adsorbent produced by such a production method, and an adsorption apparatus which shows excellent reproducibility.

In order to achieve the above object, the present invention is directed to a method for producing an adsorbent capable of selectively adsorbing an object compound, the method comprising the steps of:

preparing a base material having a surface, in which at least part of the surface of the base material is formed of a material containing as its major component apatite which is represented by the composition formula $Ca_{10}(PO_4)_6((OH)_{1-a}X_a)_2$, where X represents at least one halogen element and $0 \leq a \leq 1$;

preparing a solution containing ions of at least one metal element selected from bivalent metal elements, trivalent metal elements, lanthanoid metal elements, and actinoid metal elements;

substituting at least part of Ca of the apatite by the at least one metal element by bringing the base material into contact with the solution to obtain a substituted base material; and subjecting the substituted base material to heat treatment at 50 to 400° C. for 0.5 to 10 hours, wherein the base material and the substituted base material are not exposed to a temperature exceeding 500° C. for 4 hours or longer from the substitution step to the completion of production of the adsorbent.

According to such a method, it is possible to obtain an adsorbent which can selectively adsorb an object compound and which is stable toward a liquid such as an eluant (solvent resistance) and which shows excellent reproducibility in adsorbing and separating the compound.

In the present invention, it is preferred that the a is equal to 0, that is, the apatite is represented by the composition formula $Ca_{10}(PO_4)_6(OH)_2$, the method further comprising the step of preparing a solution containing ions of at least one halogen element, and wherein in substitution step, at least part of Ca of the apatite is substituted by the at least one metal element and at least part of OH groups of the apatite is substituted by the at least one halogen element by bringing the base material into contact with the two solutions sequentially or almost simultaneously.

According to such a method, it is also possible to obtain an adsorbent which can selectively adsorb an object compound and which is stable toward a liquid such as an eluant and which shows excellent reproducibility in adsorbing and separating the compound.

In the present invention, it is preferred that the heat treatment step is carried out in an oxidative atmosphere.

This makes it possible to further densify the substituted base material, thereby enabling the metal element to be more reliably held by the adsorbent and further improving the strength of the adsorbent.

Further, in the present invention, it is also preferred that the heat treatment step comprises a first step carried out at a temperature of 50 to 250° C., and a second step carried out at a temperature higher than that of the first step.

This makes it possible to densify the substituted base material little by little (stepwise) while drying it. As a result, the metal element substituted for Ca of the apatite is more firmly held in a crystal lattice of the apatite, thereby more reliably preventing the elution of the metal element into a liquid.

In this case, it is preferred that the difference in temperature of heat treatment between the first step and the second step is 50° C. or higher.

This makes it possible to densify the substituted base material little by little (stepwise) while drying it. As a result, the metal element substituted for Ca of the apatite is even more firmly held in a crystal lattice of the apatite, thereby even more reliably preventing the elution of the metal element into a liquid.

Furthermore, in the present invention, it is also preferred that the substitution rate of Ca of the apatite by the metal element is 0.01 wt % or higher.

By setting the substitution rate to a value within the above range, it is possible to allow the metal element to be reliably held in a crystal lattice of the apatite during densification of the apatite. If the substitution rate is too small, there is a fear that it is not possible to sufficiently impart ability to specifically adsorb the compound to the adsorbent, depending on, for example, the kind of metal element used.

Moreover, in the present invention, it is also preferred that the substitution rate of OH groups of the apatite by the halogen element is 30% or higher.

If the substitution rate is too small, there is a fear that it is not possible to sufficiently improve the stability of the apatite (adsorbent) toward a liquid such as an eluant or the reproducibility of the apatite (adsorbent) in selectively adsorbing and separating an object compound, depending on, for example, the kind of halogen element X used.

Another aspect of the present invention is directed to an adsorbent produced by the above-described method for producing an adsorbent.

This makes it possible to more reliably prevent the elution of the metal element substituted for Ca of the apatite into a liquid such as an eluant. Therefore, it is possible to obtain an adsorbent which is stable toward the liquid and which shows excellent reproducibility in selectively adsorbing and separating the compound.

In the adsorbent according to the present invention, it is preferred that when a liquid containing the compound is brought into contact with the adsorbent, the amount of the metal element eluted into the liquid is suppressed.

This makes it possible to obtain an adsorbent which is stable toward a liquid such as an eluant and which shows excellent reproducibility in selectively adsorbing and separating the compound.

The other aspect of the present invention is directed to an adsorption apparatus comprising a column having an adsorbent filling space and the above-described adsorbent filled in at least part of the adsorbent filling space.

This makes it possible to obtain an adsorption apparatus which is stable toward a liquid such as an eluant and which shows excellent reproducibility in selectively adsorbing and separating the compound.

DETAILED DESCRIPTION OF THE INVENTION

Hereinbelow, a method for producing an adsorbent, an adsorbent, and an adsorption apparatus according to the present invention will be described in detail with reference to preferred embodiments.

Figure 1:
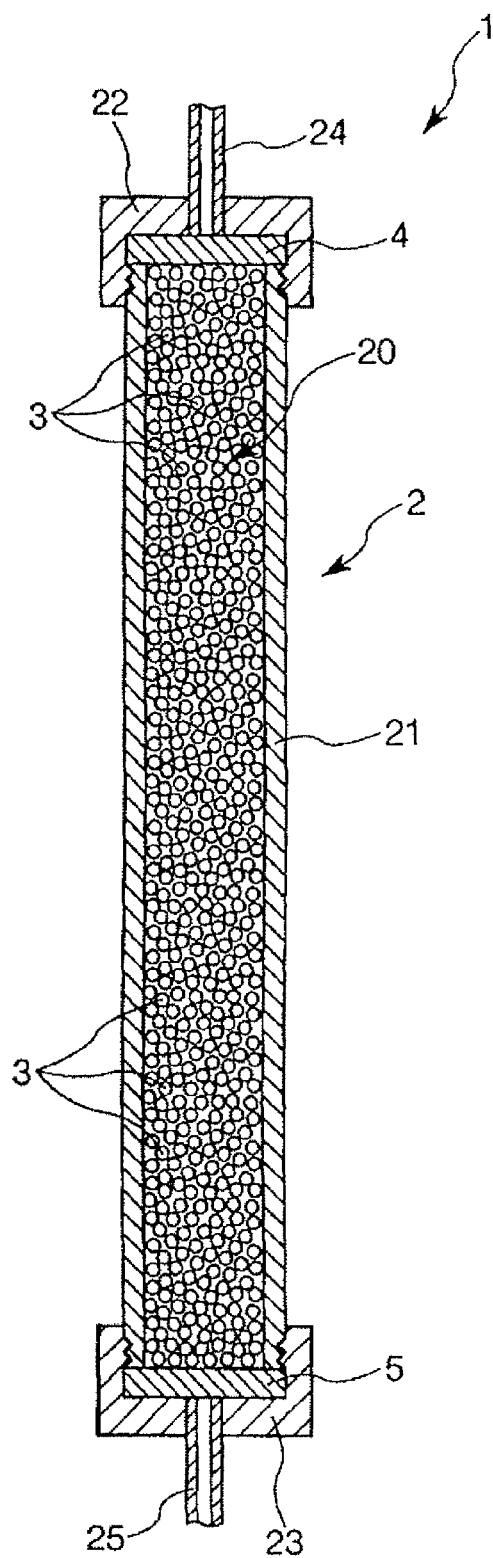
FIG. 1 is a cross-sectional view which shows an embodiment of an adsorption apparatus according to the present invention.

FIG. 1 is a cross-sectional view which shows an embodiment of the adsorption apparatus according to the present invention. It is to be noted that in the following description, the upper side and the lower side in FIG. 1 will be referred to as "inflow side" and "outflow side", respectively.

Here, the "inflow side" means the side from which a liquid such as a sample or an eluant is fed into the adsorption apparatus according to the present invention for separating and purifying an object compound. On the other hand, the "outflow side" means the side opposite to the "inflow side", that is, the side from which the liquid flows out of the adsorption apparatus according to the present invention.

The adsorption apparatus 1 shown in FIG. 1 includes a column 2, a particulate adsorbent 3, and two filter members 4 and 5.

The column 2 includes a column body 21, and caps 22 and 23 attached to the inflow side end and the outflow side end of the column body 21, respectively.

The column body 21 is formed from a hollow cylindrical member. Examples of a constituent material of each of the components (members) constituting the column 2 including the column body 21 include various glass materials, various resin materials, various metallic materials, and various ceramic materials.

The column body 21 has an opening on each of the both ends thereof, and the opening on the inflow side and the opening on the outflow side are covered with the filter members 4 and 5, respectively. In such a state, the caps 22 and 23 are threadedly attached to the inflow side end and the outflow side end of the column body 21, respectively.

The column 2 having such a structure described above has an adsorbent filling space 20 defined by the column body 21 and the filter members 4 and 5. At least part of the adsorbent filling space 20 is filled with the adsorbent 3 (in this embodiment, the adsorbent filling space 20 is almost full of the adsorbent 3).

The liquid-tightness of the column body 21 is ensured by attaching the caps 22 and 23 to the column body 21.

An inlet pipe 24 and an outlet pipe 25 are liquid-tightly fixed into substantially middle portions of the caps 22 and 23, respectively. Through the inlet pipe 24 and the filter member 4, a liquid such as a sample or an eluant is fed to the adsorbent 3. The liquid fed to the adsorbent 3 passes through pore spaces (gaps) between particles of the adsorbent 3, and then the liquid passes through the filter member 5 and the outlet pipe 25, and then flows out of the column 2. As a result, components (compounds) contained in the sample are separated from each other based on the difference in degree of adsorption to the adsorbent 3.

Each of the filter members 4 and 5 has the function of preventing the discharge of the adsorbent 3 from the adsorbent filling space 20, and is formed from, for example, non-woven fabrics, foams (sponge-like porous bodies having interconnected pores), woven fabrics, or meshes made of synthetic resins such as polyurethane, polyvinyl alcohol, polypropylene, polyetherpolyamide, polyethyleneterephthalate, and polybutyleneterephthalate.

The adsorbent 3 is obtained by substituting at least part of Ca of apatite (hydroxyapatite) which mainly forms at least part of the surface of the adsorbent and which is represented by the composition formula $Ca_{10}(PO_4)_6OH_2$, by at least one metal element selected from bivalent metal elements, trivalent metal elements, lanthanoid metal elements, and actinoid metal elements (that is, from metal elements except for alkali metal elements), and preferably further substituting at least part of OH groups of the apatite by at least one halogen element, and then subjecting the adsorbent to heat treatment at 50 to 400° C. for 0.5 to 10 hours.

By substituting at least part of Ca of the apatite by at least one metal element selected from bivalent metal elements, trivalent metal elements, lanthanoid metal elements, and actinoid metal elements (hereinafter, simply referred to as a "metal element"), it becomes possible for the adsorbent 3 to specifically adsorb a compound having a site that can be bound to the metal element with high affinity (that is, with high bonding force). As a result, the adsorbent 3 shows higher selectivity for a compound having a site that can be bound to the metal element with high affinity than for other compounds.

Here, examples of the compound which is specifically adsorbed (bound) to the metal element include compounds having at least two unshared electron pairs. Such a compound forms a coordinate bond (chelate) with the metal element at its site (e.g., a substituent or a side chain) having an unshared electron pair. The coordinate bond is stronger than normal adsorption (that is, than electric bond). Therefore, the use of such an adsorbent 3 composed of apatite, at least part of Ca of which has been substituted by the metal element, allows the compound to be reliably adsorbed to the adsorbent 3 so that the compound is separated from other compounds and purified (isolated).

Although there are various compounds having at least two unshared electron pairs, sulfur-containing amino acids, heterocyclic amino acids, and polypeptides having these amino acids as amino acid residues have a particularly high ability to form a chelate with the metal element. In other words, the adsorbent 3 exhibits a high ability to specifically adsorb one or two or more of sulfur-containing amino acids, heterocyclic amino acids, and polypeptides having these amino acids as amino acid residues.

Among them, cysteine that is one of sulfur-containing amino acids and histidine or tryptophan that is one of heterocyclic amino acids have an especially high ability to form a chelate with the metal element. Therefore, the adsorbent 3 is suitable for use in separating and purifying these amino acids or polypeptides (proteins) having relatively large amounts of these amino acids as amino acid residues. Specific examples of these proteins include myoglobin and recombinant proteins into which a polypeptide composed of a plurality of cysteines, histidines or tryptophans has been introduced (added) as a tag.

As the metal element, various metal elements can be used, but at least one bivalent transition metal element is particularly preferably used. This is because a bivalent transition metal element can be easily substituted for Ca of the apatite and efficiently introduced into a crystal lattice of the apatite. Further, a bivalent transition metal element has especially high affinity for amino acid, and therefore can adsorb the above-mentioned amino acids and proteins having these amino acids as amino acid residues with high accuracy.

Among bivalent transition metal elements, it is more preferred that at least one element selected from Zn, Ni, Co, and Cu is mainly used as the metal element. By substituting Ca of the apatite by at least one element selected from Zn, Ni, Co, and Cu, the above-described effect can be made more pronounced.

The substitution rate of Ca of the apatite by the metal element is not particularly limited, but is preferably 0.01 wt % or higher, and more preferably about 0.1 to 10 wt %. By setting the substitution rate to a value within the above range, it is possible to allow the metal element to be reliably held in a crystal lattice of the apatite during densification of the apatite. If the substitution rate is too small, there is a fear that it is not possible to sufficiently impart ability to specifically adsorb the compound to the adsorbent 3, depending on the kind of metal element used.

All the OH groups of the apatite may be non-substituted ones, but at least part of the OH groups are preferably substituted by halogen groups. This enhances the bonding force between elements (ions) constituting the apatite, thereby improving the stability of the apatite (adsorbent 3) toward a liquid such as an eluant (particularly, acid resistance). As a result, the adsorbent 3 shows excellent reproducibility in adsorbing and separating an object compound (e.g., a protein).

As the halogen element, one or more elements can be appropriately selected from F, Cl, Br, I, and At. Among them, it is preferred that F is mainly used as the halogen element. A fluoride ion has a higher electronegativity than other halide ions. Therefore, by substituting at least part of OH groups of the apatite by fluoro groups, it is possible to further enhance the effect described above.

The substitution rate of OH groups of the apatite by the halogen element is not particularly limited, but is preferably as high as possible. More specifically, the substitution rate is preferably 30% or higher, and more preferably 50% or higher. If the substitution rate is too small, there is a fear that it is not possible to sufficiently improve the stability of the adsorbent 3 toward a liquid such as an eluant or the reproducibility of the adsorbent 3, depending on, for example, the kind of halogen element used.

Further, it is preferred that the adsorbent 3 as described above has a particulate form (or a granular form), but the adsorbent 3 may have other forms such as a pellet-like form (or a small-block form) and a block form (for example, a porous body in which adjacent pores are interconnected or a honeycomb form). By allowing the adsorbent 3 to have a particulate form, it is possible to increase the surface area of the adsorbent 3, thereby further increasing the amount of the above-described compound to be adsorbed to the adsorbent 3.

The average particle size of particles of the adsorbent 3 is not particularly limited, but is preferably in the range of about 0.5 to 150 μm, and more preferably in the range of about 1 to 40 μm. By using the adsorbent 3 having such an average particle size, it is possible to allow the adsorbent 3 to have a sufficient surface area while preventing clogging of the column reliably.

In this regard, it is to be noted that the entire of the adsorbent 3 is composed of the metal element- and halogen element-substituted apatite, or otherwise only a part of the surface (the surface and its vicinity) of the adsorbent 3 is composed of such apatite.

Further, in a case where the adsorbent filling space 20 is almost full of the adsorbent 3 as in the case of this embodiment, it is preferred that all the adsorbent 3 contained in the adsorbent filling space 20 has substantially the same composition. This makes it possible for the adsorption apparatus 1 to have a particularly high ability to separate and purify the compound described above.

In this regard, it is to be noted that the adsorbent 3 may be filled in only a part of the adsorbent filling space 20 (for example, in only a part of the adsorbent filling space 20 in the vicinity of the inflow pipe 24). In this case, the remaining part of the adsorbent filling space 20 is filled with a different adsorbent.

The adsorption apparatus 1 as described above can be manufactured by, for example, previously producing the adsorbent 3 and then filling the adsorbent 3 into the adsorbent filling space 20.

1. Production of Adsorbent

Hereinbelow, a method for producing an adsorbent (that is, a method for producing an adsorbent according to the present invention) will be described.

First Embodiment

First, a first embodiment of the method for producing an adsorbent according to the present invention will be described.

The first embodiment of the method for producing an adsorbent comprises the steps of: preparing a base material having a surface, in which at least part of the surface of the base material is formed of a material containing as its major component apatite which is represented by the composition formula $Ca_{10}(PO_4)_6((OH)_{1-a}X_a)_2$, where X represents at least one halogen element and $0 \leq a \leq 1$; preparing a solution containing ions of at least one of the above-mentioned metal elements (hereinafter, simply referred to as a "solution A"); substituting at least part of Ca of the apatite by the metal element by bringing the base material into contact with the solution to obtain a substituted base material; and subjecting the substituted base material to heat treatment at 50 to 400° C. for 0.5 to 10 hours, wherein the base material and the substituted base material are not exposed to a temperature exceeding 500° C. for 4 hours or longer from the substitution step to the completion of production of the adsorbent 3.

Hereinbelow, each of the steps will be described.

(1) Base Material Preparation Step

The base material is produced by a well-known method.

(2) Solution Preparation Step

The solution A is prepared by dissolving a compound containing the metal element in a solvent.

(3) Substitution Step

Next, the base material is brought into contact with the solution A.

Examples of a method for bringing the base material into contact with the solution A (hereinafter, simply referred to as a "contact method") include immersion of the base material in the solution A, spraying (showering) of the solution A on the base material, and applying of the solution A onto the base material (hereinafter, simply referred to as an "applying method"). These methods can be used singly or in combination of two or more of them.

Among these methods, immersion of the base material in the solution A (hereinafter, simply referred to as an "immersion method") is suitable as the contact method. By using such an immersion method, it is possible to treat a large amount of the base material at a time.

Hereinbelow, the immersion method will be described as a representative example of the contacting method.

First, the base material is immersed in the solution A to substitute Ca of the apatite by the metal element.

The amount of ions of the metal element contained in 1 L of the solution A is preferably in the range of about 0.01 to 10 mmol per mmol of the apatite. Particularly, in a case where the immersion method is used, the amount of ions of the metal element contained in 1 L of the solution A is preferably in the range of about 0.05 to 5 mmol, and more preferably in the range of about 0.1 to 1 mmol. If the amount of ions of the metal element contained in 1 L of the solution A is too small, the base material has less opportunity to come into contact with the ions of the metal element, thus resulting in a case where the time required for substituting Ca of the apatite by the metal element is unnecessarily prolonged. On the other hand, even if the amount of ions of the metal element contained in 1 L of the solution A is increased so as to exceed the above upper limit value, it cannot be expected that the efficiency of substituting Ca by ions of the metal element is further enhanced.

The immersion time of the base material in the solution A (contact time) is not particularly limited. In a case where the amount of ions of the metal element contained in 1 L of the solution A is within the above range, the immersion time is preferably in the range of about 0.1 to 10 hours, and more preferably in the range of about 2 to 6 hours. By setting the immersion time to a value within the above range, the ions of the metal element are efficiently substituted for Ca of the apatite and introduced into a crystal structure of the apatite.

The temperature of the solution A is not particularly limited as long as it is about room temperature, but is preferably in the range of about 10 to 40° C., and more preferably in the range of about 15 to 25° C.

During the immersion of the base material in the solution A, the solution A may be vibrated by stirring or shaking. By doing so, it can be expected that the efficiency of introducing the ions of the metal element into a crystal structure of the apatite is enhanced.

It is to be noted that in a case where a method other than the immersion method (for example, the other methods described above) is used as the contact method, various conditions such as the concentration or temperature of the solution A and the number of times the solution A is sprayed or applied on the base material can be appropriately controlled so that a desired substitution rate of Ca of the apatite by the metal element can be obtained.

(4) Cleaning Step

Next, the base material, at least part of Ca of the apatite of which has been substituted by the metal element (hereinafter, simply referred to as a "substituted base material") is taken out of the solution A, and is then subjected to cleaning to remove the ions of the metal element, which have not been substituted for Ca of the apatite, from the substituted base material.

Preferred examples of a solution to be used for cleaning the metal element-substituted base material include water, ultrapure water, various buffer solutions, and ion-exchange water.

It is to be noted that the cleaning step is carried out, if necessary, or otherwise omitted.

(5) Heat Treatment Step

Next, the substituted base material is subjected to heat treatment at 50 to 400° C. for 0.5 to 10 hours. The reason why the effect of the present invention can be obtained by carrying out heat treatment under such conditions is not exactly known, but can be considered as follows: the substituted base material is dried and moderately densified so that the metal element substituted for Ca of the apatite is firmly held by the base material.

Unlike the adsorbent 3 according to the present invention, in the case of an adsorbent not subjected to heat treatment or an adsorbent subjected to heat treatment at a low temperature less than 50° C. for a time period within the above range, the metal element is incorporated inside a crystal lattice of the apatite without being exposed at the surface of the adsorbent. Therefore, phosphoric acid sites negatively charged in the adsorbent have a large influence on an object compound so that the adsorbent and the compound (for example, a protein likely to be negatively charged) repel each other.

Further, such an adsorbent is not sufficiently densified, and therefore the metal element substituted for Ca of the apatite tends to be easily eliminated from the adsorbent, thereby easily causing elution of the metal element into a liquid such as an eluant.

In a case where the substituted base material is subjected to heat treatment at a high temperature (that is, at a temperature exceeding 400° C., for example, about 800° C.) for a time period within the above range as in the case of a conventional adsorbent, the substituted base material is excessively densified, that is, the crystal structure of the apatite is excessively compacted. As a result, the metal element substituted for Ca of the apatite is pushed out of the crystal lattice of the apatite, and therefore the metal element is eliminated from the absorbent, thereby easily causing elution of the metal element into a liquid such as an eluant.

On the other hand, according to the method for producing an adsorbent of the present invention, the substituted base material is subjected to heat treatment at a temperature of 50° C. or higher for 0.5 to 10 hours. This makes it possible to moderately densify the substituted base material, thereby enabling the metal element substituted for Ca of the apatite to be firmly held in a crystal lattice of the apatite and increasing the strength of the adsorbent 3.

Further, according to the method for producing an adsorbent of the present invention, the heat treatment is carried out at a temperature of 400° C. or less for 0.5 to 10 hours, thereby reliably preventing the elution of the metal element substituted for Ca of the apatite into a liquid such as an eluant caused by pushing the metal element out of a crystal lattice of the apatite.

The temperature of the heat treatment (hereinafter, simply referred to as a "heat treatment temperature") is in the range of 50 to 400° C., preferably in the range of about 100 to 400° C., and more preferably in the range of about 200 to 300° C. If the heat treatment temperature is less than the above lower limit value, there is a fear that as described above, the substituted base material is not densified so that the metal element substituted for Ca of the apatite is easily eliminated from the base material and is then eluted into various liquids. On the other hand, if the heat treatment temperature exceeds the above upper limit value, there is a fear that as described above, the substituted base material is excessively densified and the metal element substituted for Ca of the apatite is pushed out of a crystal lattice of the apatite so that the metal element is easily eliminated from the base material and is then eluted into various liquids.

The time for the heat treatment is within the above range, that is, in the range of 0.5 to 10 hours, preferably in the range of about 2 to 10 hours, and more preferably in the range of about 3 to 7 hours.

By setting the time for heat treatment to a value within the above range, it is possible to sufficiently densify the substituted base material, thereby enabling the metal element substituted for Ca of the apatite to be firmly held by the adsorbent 3. In addition, it is also possible to reliably prevent the metal element from being pushed out of a crystal lattice of the apatite, thereby properly preventing or suppressing the elution of the metal element of the adsorbent 3 into a liquid.

The heat treatment can be carried out in any atmosphere, for example, in the air, an oxidative atmosphere such as a mixed gas mainly containing oxygen gas, a nitrogen gas atmosphere, or an inert gas atmosphere such as argon gas or helium gas. Among them, an oxidative atmosphere is preferred. By carrying out the heat treatment in an oxidative atmosphere, it is possible to further densify the substituted base material. As a result, the metal element is reliably held by the resulting adsorbent 3.

In a case where the heat treatment step is carried out at a relatively high temperature, heat treatment is preferably carried out in two steps. More specifically, it is preferred that a first step of heat treatment is first carried out at a relatively low temperature within a range of 50 to 400° C., that is, at a temperature of 50 to 250° C., and then a second step of heat treatment is carried out at a temperature higher than that of the first step but 400° C. or lower. This makes it possible to densify the substituted base material little by little (stepwise) while drying it. As a result, the metal element substituted for Ca of the apatite is more firmly held in a crystal lattice of the apatite, thereby more reliably preventing the elution of the metal element into a liquid.

The difference in temperature of heat treatment between the first step and the second step slightly varies depending on the kind of metal element used, but is preferably 50° C. or higher, and more preferably about 50 to 100° C. This makes the effect described above more pronounced.

Further, the difference in time of heat treatment between the first step and the second step is not particularly limited. However, it is preferred that the time of the first step is relatively shorter than that of the second step.

More specifically, when the time of the first step is defied as A (time) and the time of the second step is defied as B (time), A and B preferably satisfy the relationship: A/(A+B)=0.1 to 0.4, and more preferably satisfy the relationship: A/(A+B)=0.2 to 0.3. By setting A and B so as to satisfy the above relationship, densification of the substituted base material is carried out by the second step of heat treatment after the metal element unstably held in a crystal lattice of the apatite is made relatively stable by the first step of heat treatment. This makes the effect obtained by stepwise densification of the base material more pronounced.

It is to be noted that in a case where the heat treatment is carried out stepwise as described above, the number of steps is not limited to two, and may be three or more.

In this way, the adsorbent 3 is produced.

By carrying out these steps according to the first embodiment, it is possible to produce the adsorbent 3 without exposing the base material to a temperature exceeding 500° C. for 4 hours or longer from the substitution step to the completion of the production of the adsorbent 3.

Further, it is preferred that the adsorbent 3 is produced without exposing the base material to a temperature exceeding 460° C. for 4 hours or longer, and it is more preferred that the adsorbent 3 is produced without exposing the base material to a temperature exceeding 430° C. for 4 hours or longer. By producing the adsorbent 3 while satisfying such a condition, it is possible to prevent excessive densification of the adsorbent 3, thereby reliably preventing the metal element held by the adsorbent 3 from being pushed out of a crystal lattice of the apatite and thus eluted into the liquid.

Second Embodiment

Next, a second embodiment of the method for producing an adsorbent according to the present invention will be described.

It is to be noted that the second embodiment of the adsorbent production method will be described by focusing the difference between the first and second embodiments and an explanation of the overlapping points will be omitted.

The second embodiment is different from the first embodiment in only the substitution step, and others are the same as those in the first embodiment.

More specifically, in the substitution step of the second embodiment, a base material, at least part of the surface of which is mainly composed of apatite represented by the composition formula $Ca_{10}(PO_4)_6(OH)_2$ (that is, the a is equal to 0 in the above-mentioned composition formula $Ca_{10}(PO_4)_6((OH)_{1-a}X_a)_2$), is brought into contact with the same solution A as used in the first embodiment and a solution containing ions of at least one halogen element (hereinafter, simply referred to as a "solution B") sequentially to substitute at least part of Ca and at least part of OH groups of the apatite by the metal element and the halogen element, respectively.

It is to be noted that the solution B is prepared by dissolving a compound containing the halogen element in a solvent.

Also in the second embodiment, an immersion method will be described as a representative example of a method for bringing the base material into contact with the solution A and the solution B (hereinafter, simply referred to as a "contact method").

First, the base material is immersed in the solution A in the same manner as in the first embodiment to substitute Ca of the apatite by the metal element. Thereafter, the base material is taken out of the solution A, and is then immersed in the solution B to substitute OH groups of the apatite by the halogen element.

The amount of ions of the halogen element contained in 1 L of the solution B is preferably in the range of about 0.1 to 2 mmol per mol of the apatite. Particularly, in a case where the immersion method is used, the amount of ions of the halogen element contained in 1 L of the solution B is preferably in the range of about 1 to 1.5 mmol, and more preferably in the range of about 1 to 1.2 mmol. If the amount of ions of the halogen element contained in 1 L of the solution B is too small, the base material has less opportunity to come into contact with the ions of the halogen element, thus resulting in a case where the time required for substituting OH groups of the apatite by halogen groups is unnecessarily prolonged. On the other hand, even if the amount of ions of the halogen element contained in 1 L of the solution B is increased so as to exceed the above upper limit value, it cannot be expected that the efficiency of substituting OH groups by halogen groups is further enhanced.

The immersion time of the base material in the solution B (contact time) is not particularly limited. In a case where the amount of ions of the halogen element contained in 1 L of the solution B is within the above range, the immersion time is preferably in the range of about 1 to 6 hours, and more preferably in the range of about 2 to 6 hours. By setting the immersion time to a value within the above range, the ions of the halogen element are efficiently substituted for OH groups of the apatite and introduced into a crystal structure of the apatite.

The temperature of the solution B is not particularly limited as long as it is about room temperature, but is preferably in the range of about 10 to 40° C., and more preferably in the range of about 15 to 25° C.

It is to be noted that the immersion of the base material in the solution A and the solution B may be carried out repeatedly Further, in the above description, the base material is first immersed in the solution A and then immersed in the solution B, but alternatively the base material may be first immersed in the solution B and then immersed in the solution A, or the base material may be immersed in the solution A and the solution B almost simultaneously (that is, the base material may be immersed in the mixture of the solution A and the solution B).

As in the case of the first embodiment, in addition to the immersion method, other contact methods such as spraying (showering) of the solution A and the solution B on the base material and applying of the solution A and the solution B onto the base material (applying method) can be used. These contact methods can be used in combination of two or more of them.

2. Filling of Adsorbent into Adsorbent Filling Space

The adsorbent 3 can be filled in the adsorbent filling space 20 by a well-known dry filling method or wet filling method, but a wet filling method is particularly preferably used.

Filling of the adsorbent 3 into the adsorbent filling space 20 by a wet filling method is carried out in the following manner. First, the opening on the outflow side of the column body 21 is covered with the filter member 5 and then the cap 23 is threadedly attached to the outflow side end of the column body 21. Then, the adsorbent 3 is dispersed (suspended) in, for example, distilled water to obtain a uniform slurry, and the slurry is fed into the adsorbent filling space 20 so that the adsorbent 3 is uniformly filled in the adsorbent filling space 20. Then, the opening on the inflow side of the column body 21 is covered with the filter member 4, and then the cap 22 is threadedly attached to the inflow side end of the column body 21.

In this way, the adsorption apparatus 1 is manufactured.

It is to be noted that the adsorbent 3 (that is, the adsorbent of the present invention) filled in the adsorbent filling space 20 of the adsorption apparatus 1 has been sufficiently densified, and therefore the elution of the metal element and/or the halogen element substituted for Ca and/or OH groups of the apatite into various liquids is reliably prevented. This improves the solvent resistance (especially, acid resistance) of the adsorbent 3 and makes it possible to maintain the adsorption ability of the adsorbent 3 for a long time, thereby improving the reproducibility of the adsorbent 3 (adsorption apparatus 1). Further, the improved solvent resistance of the adsorbent 3 makes it possible to properly prevent or suppress the disintegration of the apatite, thereby reliably preventing the clogging of the filter member 5 of the adsorption apparatus 1.

Next, separation and purification of a protein (polypeptide) will be described as a representative example of the usage of the adsorption apparatus 1.

First, two or more kinds of proteins are dissolved in a buffer solution to prepare a sample solution. Then, the sample solution is fed to the adsorbent 3 through the inlet pipe 24 and the filter member 4 to pass through the column 2. As a result, a component (compound) which is not adsorbed to the adsorbent 3 or a component (compound) having a low adsorbability to the adsorbent 3 flows out of the column 2 through the filter member 5 and the outlet pipe 25. On the other hand, a component (compound) having a high adsorbability to the adsorbent 3 is retained in the column 2.

Examples of the buffer solution to be used include a phosphate buffer, a Tris-HCl buffer, a Good's buffer, and an imidazole buffer.

Next, an eluant is fed through the inlet pipe 24 into the column 2, and then the eluant discharged from the outlet pipe 25 of the column 2 is collected.

Examples of the eluant to be used include a buffer solution containing a material (competitive reagent) having a higher adsorbability to the adsorbent 3 than that of a protein adsorbed to the adsorbent 3 and a chelating agent, a buffer solution having a higher salt concentration than that of the buffer solution described above, and a buffer solution having a lower pH (about pH 4.5 to 6) than that of the buffer solution described above. Further, when the eluant is fed into the column 2 (that is, when the eluant is passed through the adsorbent filling space 20), the concentration of a solute in the eluant may be changed with the lapse of time.

When the eluant comes into contact with the adsorbent 3, the protein adsorbed to the adsorbent 3 is removed from the adsorbent 3, and is then mixed into the eluant. As a result, the protein is collected in the eluant discharged from the outlet pipe 25.

Although the method for producing an adsorbent, the adsorbent, and the adsorption apparatus according to the present invention have been described above, the present invention is not limited thereto.

EXAMPLES

Next, actual examples of the present invention will be described.

1. Manufacture of Adsorption Apparatus

In the following Examples 1 to 3 and the Comparative Examples 1 to 4, adsorption apparatuses were manufactured.

Example 1

Step of Preparing Base Material

Hydroxyapatite was synthesized by a well-known wet synthesis method to obtain a hydroxyapatite slurry.

The hydroxyapatite slurry was spray-dried to obtain a powder having an average particle size of 40 µm.

<Step of Preparing Aqueous $Zn(NO_3)_2$ Solution>

A aqueous $Zn(NO_3)_2$ solution was prepared by dissolving $Zn(NO_3)_2$ in water so that the concentration thereof was 5 mM.

<Substitution Step>

Next, 3.0 g of the hydroxyapatite powder (raw material powder) was immersed in 150 mL of the aqueous $Zn(NO_3)_2$ solution with stirring for 6 hours to obtain a powder whose Ca of hydroxyapatite was substituted by Zn.

<Cleaning Step>

Next, the thus obtained powder was taken out of the aqueous $Zn(NO_3)_2$ solution, and was cleaned with ion-exchange water.

<Heat Treatment Step>

Next, the powder was subjected to heat treatment in the air at 200° C. for 1 hour to obtain an adsorbent.

It is to be noted that it was found by elemental analysis that 1 wt % of Ca of hydroxyapatite forming the surface of the adsorbent was substituted by Zn.

The elemental analysis was performed using an elemental analyzer ("Ion Chromatograph HIC-SP" manufactured by Shimadzu Corporation).

<Manufacture of Column>

The adsorbent was filled in an adsorbent filling space of a column (inner diameter 4 mm×length 100 mm) by a well-known wet filling method.

The amount of the adsorbent filled in the adsorbent filling space was 1 g (about 1 mmol).

Example 2

An adsorbent and an adsorption apparatus were manufactured in the same manner as in the Example 1 except that heat treatment was further carried out in the air at 300° C. for 4 hours after the heat treatment step.

Example 3

An adsorbent and an adsorption apparatus were manufactured in the same manner as in the Example 1 except that heat treatment was further carried out in the air at 400° C. for 4 hours after the heat treatment step.

Comparative Example 1

An adsorbent and an adsorption apparatus were manufactured in the same manner as in the Example 1 except that the heat treatment step was omitted but the powder was naturally dried (at 25° C.).

Comparative Example 2

An adsorbent and an adsorption apparatus were manufactured in the same manner as in the Example 1 except that heat treatment was further carried out in the air at 500° C. for 4 hours after the heat treatment step.

Comparative Example 3

An adsorbent and an adsorption apparatus were manufactured in the same manner as in the Example 1 except that heat treatment was further carried out in the air at 600° C. for 4 hours after the heat treatment step.

Comparative Example 4

An adsorbent and an adsorption apparatus were manufactured in the same manner as in the Example 1 except that heat treatment was further carried out in the air at 700° C. for 4 hours after the heat treatment step.

2. Evaluation

Amino acid adsorption characteristics of each of the adsorption apparatuses manufactured in the Examples 1 to 3 and the Comparative Examples 1 to 4 were examined in the following manner.

First, the solution filled in the column of the adsorption apparatus was replaced with a 10 mM phosphate buffer solution (pH 6.8).

Then, a sample was prepared by dissolving di-histidine in the same phosphate buffer solution as described above so that the concentration thereof was 1.0 mg/mL. 50 µL of the sample was fed into and passed through the column.

Then, a phosphate buffer solution (pH 6.8) was fed into the column at a flow rate of 1 mL/min for 20 min. It is to be noted that in the phosphate buffer solution (pH 6.8) fed into the column, the ratio of a 400 mM phosphate buffer solution mixed with a 10 mM phosphate buffer solution was increased from 0% to 100% over 15 min from the beginning of feeding of the phosphate buffer solution (pH 6.8) into the column. Thereafter, a 10 mM phosphate buffer solution (pH6.8) was fed into the column at a flow rate of 1 mL/min for 20 min to return the column to its original state.

The time that elapsed before di-histidine started to elute from the column (hereinafter, simply referred to as a "retention time") was determined by measuring the absorbance of the phosphate buffer solution flown out of the column at 230 nm.

The above-described operation was repeated five times for each of the adsorption apparatuses manufactured in the Examples 1 to 3 and the Comparative Examples 1 to 4.

Figure 2:
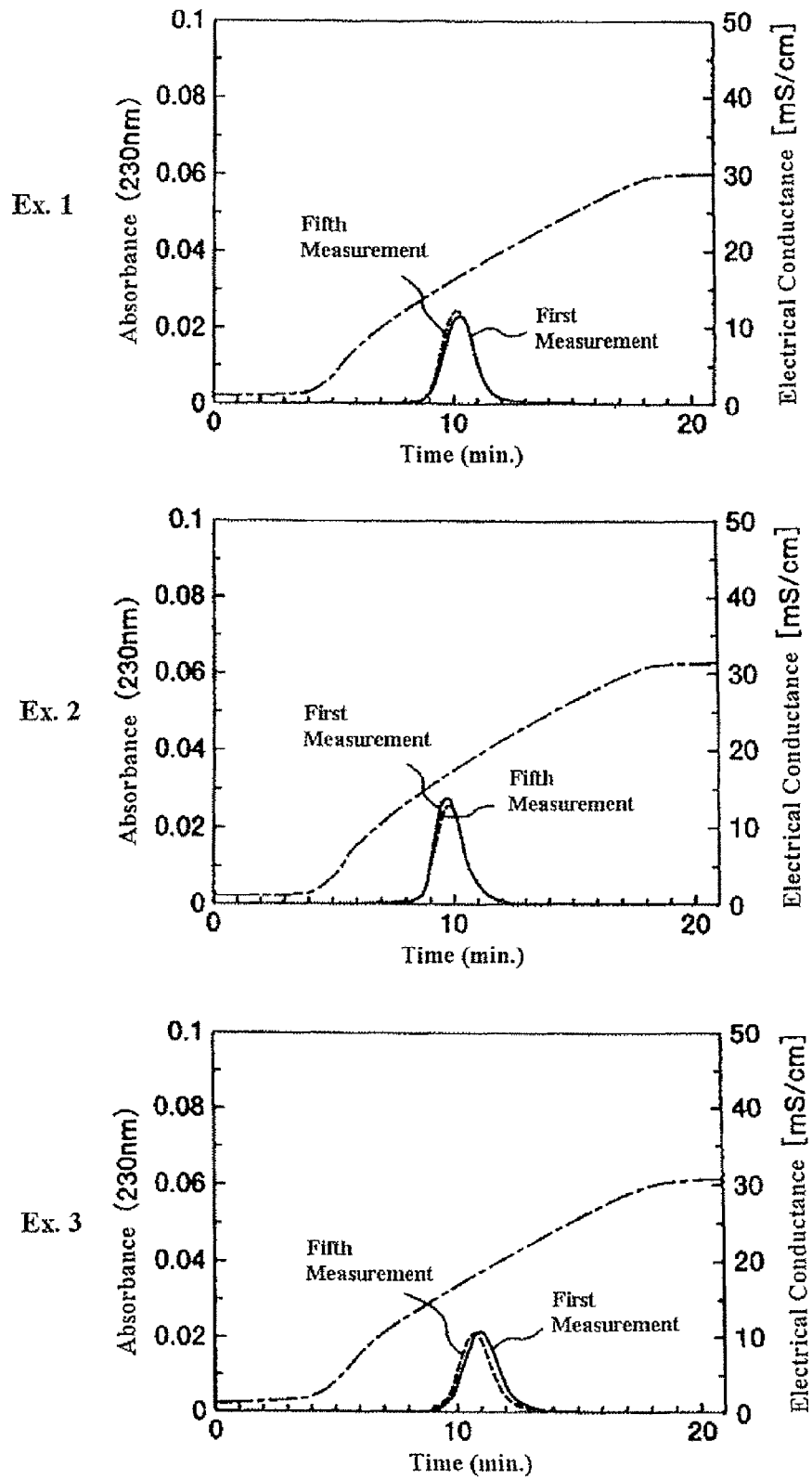
FIG. 2 shows absorbance curves at 230 nm of phosphate buffer solutions flown out of columns of adsorption apparatuses manufactured in Examples 1 to 3.
Figure 3:
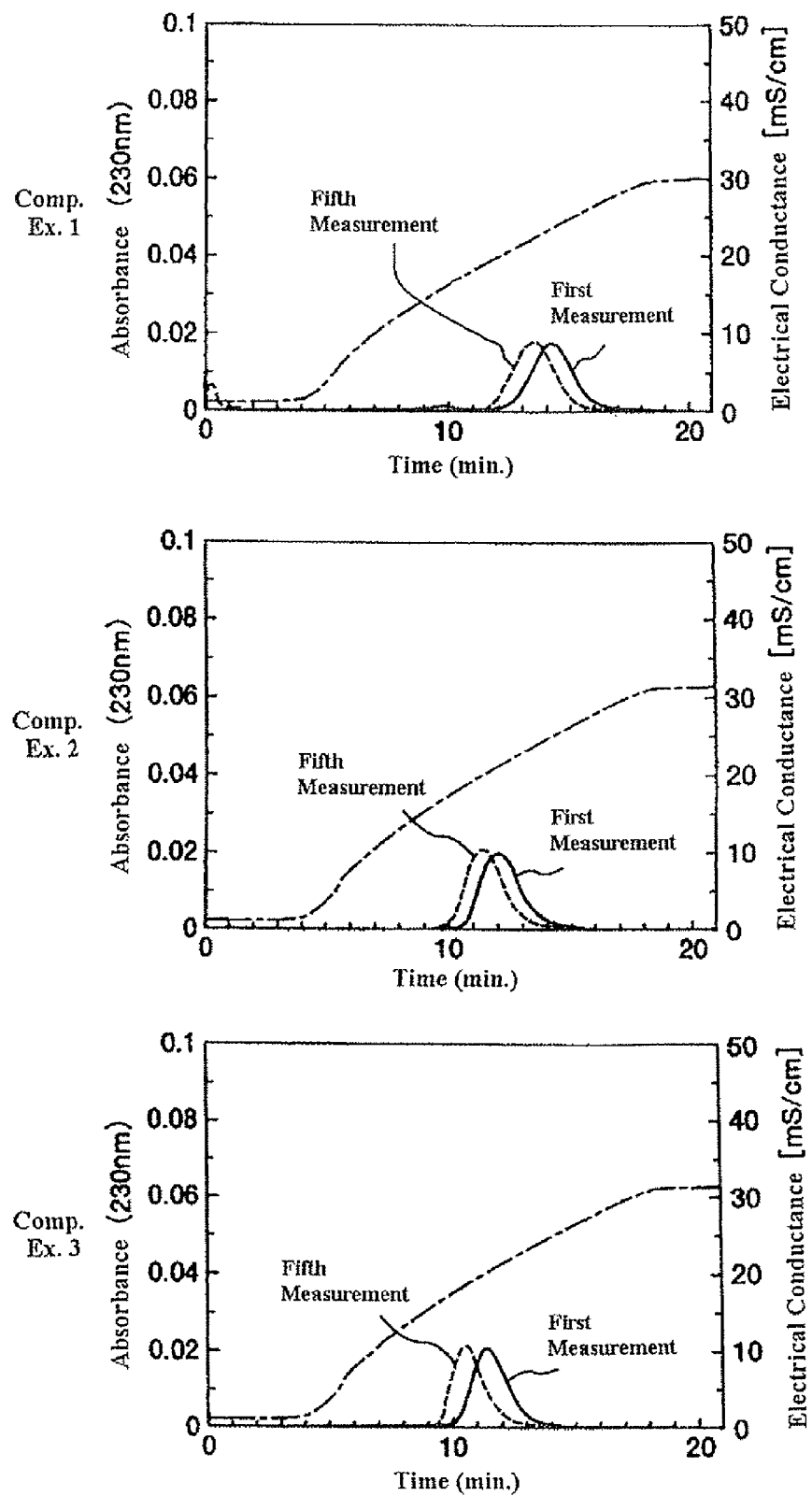
FIG. 3 shows absorbance curves at 230 nm of phosphate buffer solutions flown out of columns of adsorption apparatuses manufactured in Comparative Examples 1 to 3.
Figure 4:
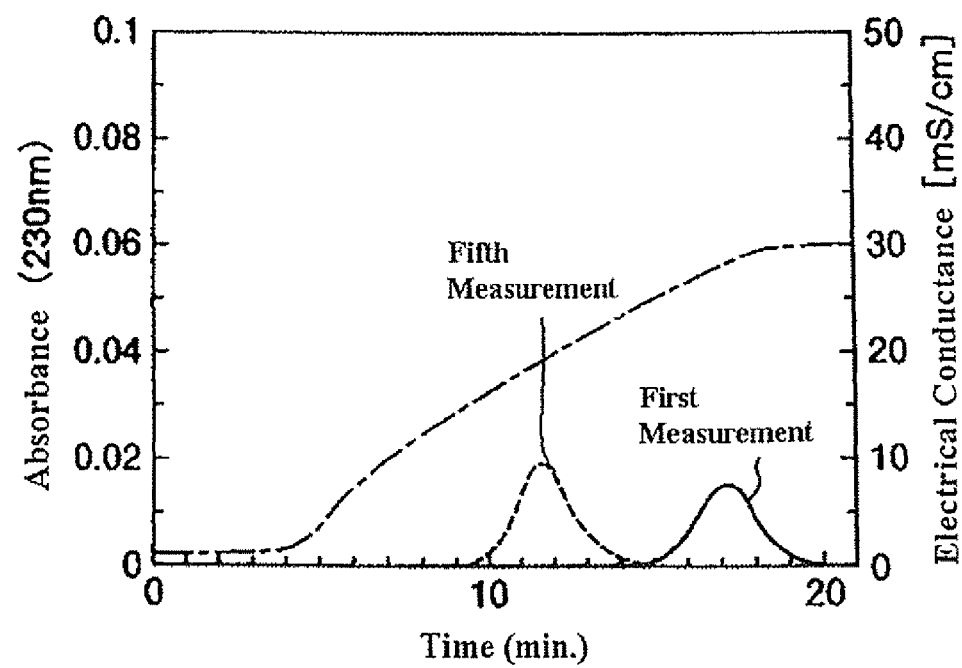
FIG. 4 shows an absorbance curve at 230 nm of a phosphate buffer solution flown out of a column of an adsorption apparatus manufactured in Comparative Example 4.

The measurement results are shown in FIGS. 2 to 4 and Table 1.

FIGS. 2 to 4 show the absorbance curves at 230 nm of the phosphate buffer solutions flown out of the columns of the adsorption apparatuses manufactured in the Examples 1 to 3 and the Comparative Examples 1 to 4.

The values of retention time shown in Table 1 were determined from peaks that appeared in the absorbance curves of the Examples and Comparative Examples.

TABLE 1

|  | Retention Time of di-histidine (min) | |
| --- | --- | --- |
|  | First Measurement | Fifth Measurement |
| Example 1 | 10.3 | 10.2 |
| Example 2 | 9.4 | 9.6 |
| Example 3 | 11.0 | 10.8 |
| Comparative Example 1 | 14.0 | 13.2 |
| Comparative Example 2 | 12.0 | 11.3 |
| Comparative Example 3 | 11.5 | 10.7 |
| Comparative Example 4 | 17.1 | 11.7 |

As shown in Table 1, in all the cases where the adsorption apparatuses manufactured in the Examples 1 to 3 were used, the retention time of di-histidine of the first measurement was substantially the same as that of the fifth measurement.

On the other hand, in all the cases where the adsorption apparatuses manufactured in the Comparative Examples 1 to 4 were used, variations in the retention time of di-histidine were observed between the first measurement and the fifth measurement.

This result suggests that the adsorbent of each of the Examples 1 to 3 was densified by heat treatment and therefore the metal element was firmly held in the structure of the apatite so that the adsorbent exhibited high stability toward a liquid such as an eluant.

Further, for each of the adsorption apparatuses of the Example 1 to 3, the above-described operation was further repeatedly carried out. As a result, slight variations were observed in the retention time of di-histidine in the case of the adsorption apparatus of the Example 3, but variations in the retention time of di-histidine were hardly observed in the case of the adsorption apparatuses of the Examples 1 and 2.

Furthermore, adsorbents and adsorption apparatuses were manufactured in the same manner as in the Examples 1 to 3 and the Comparative Example 1 to 4, respectively, except that the metal element was changed from Zn to Ni, Co, or Cu. The thus obtained adsorption apparatuses were evaluated by measuring the retention time of di-histidine in the same manner as described above. The evaluation results were the same as those which have been described above.

Moreover, the adsorption apparatuses of the Examples 1 to 3 and the Comparative Examples 1 to 4 were evaluated by measuring the retention time of amino acid in the same manner as described above except that the amino acid passed through the column was changed from di-histidine to hexa-histidine. The evaluation results were the same as those which have been described above.

EFFECT OF THE INVENTION

According to the method for producing an adsorbent of the present invention, it is possible to obtain an adsorbent having improved stability toward a liquid such as an eluant (solvent resistance) and improved reproducibility in selectively adsorbing and separating an object compound. More specifically, by introducing at least one metal element selected from bivalent metal elements, trivalent metal elements, lanthanoid metal elements, and actinoid metal elements and at least one halogen element into a crystal lattice of apatite constituting an adsorbent and then subjecting the adsorbent to heat treatment, the metal element and the halogen element are firmly held in the crystal lattice so that the solvent resistance and reproducibility of the adsorbent are improved.

Further, according to the method for producing an adsorbent of the present invention, it is also possible to easily produce a large amount of such an adsorbent according to the present invention.

Therefore, an adsorption apparatus manufactured using the adsorbent according to the present invention can prevent mixing of at least one metal element selected from bivalent metal elements, trivalent metal elements, lanthanoid metal elements, and actinoid metal elements and at least one halogen element (or ions thereof) into a liquid flown out of a column and prevent clogging of the column because disintegration of the adsorbent does not occur.

Finally, it is also to be understood that the present disclosure relates to subject matter contained in Japanese Patent Application No. 2005-329508 (filed on Nov. 14, 2005) which is expressly incorporated herein by reference in its entirety.

What is claimed is:

1. A method for producing an adsorbent capable of selectively adsorbing an object compound, the method comprising:

preparing a base material having a surface, in which at least part of the surface of the base material is formed of a material containing as its major component apatite which is represented by the composition formula $Ca_{10}(PO_4)_6((OH)_{1-a}X_a)_2$, where X represents at least one halogen element and $0 \leq a \leq 1$;

preparing a solution comprising ions of at least one metal element, wherein said metal element is at least one of a bivalent metal element, a trivalent metal element, a lanthanoid metal element, or an actinoid metal element;

substituting at least part of the Ca of the apatite with the at least one metal element by bringing the base material into contact with the solution to obtain a substituted base material; and subjecting the substituted base material to heat treatment at 50 to 400° C. for 0.5 to 10 hours, wherein the heat treatment comprises a first heat treatment step carried out at a temperature of 50 to 250° C., and a second heat treatment step carried out at a temperature higher than that of the first heat treatment step, wherein the difference in a temperature between the first heat treatment step and the second heat treatment step is 50° C. or higher and wherein the base material and the substituted base material are not exposed to a temperature exceeding 500° C. for 4 hours or longer from the time of substituting at least a part of the Ca to the completion of production of the adsorbent.

2. The method for producing an adsorbent as claimed in claim 1, wherein the apatite is represented by the composition formula $Ca_{10}(PO_4)_6(OH)_2$, the method further comprising:

preparing a solution containing ions of at least one halogen element, and wherein at least part of the Ca of the apatite is substituted by the at least one metal element and at least part of the OH groups of the apatite are substituted by the at least one halogen element by bringing the base material into contact with the two solutions sequentially or almost simultaneously.

3. The method for producing an adsorbent as claimed in claim 1, wherein the heat treatment is carried out in an oxidative atmosphere.

4. The method for producing an adsorbent as claimed in claim 1, wherein a substitution amount of the Ca of the apatite with the at least one metal element is 0.01 wt % or higher.

5. The method for producing an adsorbent as claimed in claim 1, wherein a substitution ratio of the OH groups of the apatite with the at least one halogen element is 30% or higher.

* * * * *